(12) United States Patent
Glynn et al.

(10) Patent No.: US 10,717,240 B2
(45) Date of Patent: Jul. 21, 2020

(54) METHOD FOR MAKING A HAT STIFFENER PRE-FORM WITH UNDER-CUT CHAMFERED FLANGE

(71) Applicant: THE BOEING COMPANY, Chicago, IL (US)

(72) Inventors: Andrew Kenneth Glynn, Melbourne (AU); Max Marley Osborne, Melbourne (AU); Peter J. Lockett, Victoria (AU)

(73) Assignee: THE BOEING COMPANY, Chicago, IL (US)

( * ) Notice: Subject to any disclaimer, the term of this patent is extended or adjusted under 35 U.S.C. 154(b) by 258 days.

(21) Appl. No.: 15/787,967

(22) Filed: Oct. 19, 2017

(65) Prior Publication Data
US 2019/0118492 A1    Apr. 25, 2019

(51) Int. Cl.
| | | |
|---|---|---|
| *B29C 70/30* | (2006.01) | |
| *B29C 70/54* | (2006.01) | |
| *B64C 3/34* | (2006.01) | |
| *B64C 3/18* | (2006.01) | |
| *B29D 99/00* | (2010.01) | |
| *B64C 1/06* | (2006.01) | |

(Continued)

(52) U.S. Cl.
CPC .............. *B29C 70/30* (2013.01); *B29C 70/54* (2013.01); *B29C 70/545* (2013.01); *B29D 99/0014* (2013.01); *B64C 1/064* (2013.01); *B64C 3/182* (2013.01); *B64C 3/34* (2013.01); *B29L 2031/3076* (2013.01); *B64C 1/12* (2013.01); *B64C 3/26* (2013.01)

(58) Field of Classification Search
CPC ............ B29C 70/54; B29C 70/48; B64C 1/12
See application file for complete search history.

(56) References Cited

U.S. PATENT DOCUMENTS

2008/0302912 A1* 12/2008 Yip .................. B29C 43/10
244/119
2010/0239865 A1* 9/2010 Kallinen .............. B29C 70/46
428/411.1

(Continued)

FOREIGN PATENT DOCUMENTS

EP    2676787 A1    12/2013

OTHER PUBLICATIONS

Extended European Search Report for EP Application No. 18185680.8 dated Feb. 12, 2019.

*Primary Examiner* — Jacob T Minskey
*Assistant Examiner* — Virak Nguon
(74) *Attorney, Agent, or Firm* — Marshall, Gerstein & Borun LLP

(57) ABSTRACT

A method for fabricating a hat stiffener which includes a step of positioning two or more reinforcement fiber layers about a mandrel. The method further includes a step of cutting through the two or more reinforcement fiber layers forming a first stack of first end portions of the two or more reinforcement fiber layers and a second stack of second end portions of the two or more reinforcement fiber layers wherein the first and second stacks are in overlying relationship with respect to the mandrel. In addition, the method further includes moving the first stack of the first end portions and the second stack of the second end portions of the two or more reinforcement fiber layers out of overlying relationship with respect to the mandrel.

20 Claims, 9 Drawing Sheets

(51) Int. Cl.
*B64C 3/26* (2006.01)
*B64C 1/12* (2006.01)
*B29L 31/30* (2006.01)

(56) References Cited

U.S. PATENT DOCUMENTS

| | | | |
|---|---|---|---|
| 2012/0292448 A1* | 11/2012 | Beresinski | B29C 70/222 244/158.1 |
| 2013/0337207 A1* | 12/2013 | Mueller | B29C 70/326 428/36.4 |
| 2013/0344291 A1* | 12/2013 | Pearson | B29C 70/865 428/157 |
| 2014/0186588 A1* | 7/2014 | Victorazzo | B64C 1/064 428/178 |
| 2015/0059967 A1* | 3/2015 | Fosse | B29C 70/446 156/212 |

* cited by examiner

METHOD FOR MAKING A HAT STIFFENER PRE-FORM WITH UNDER-CUT CHAMFERED FLANGE

FIELD

This disclosure relates to a method for fabricating a hat stiffener and more particularly to a hat stiffener having under-cut and chamfered flanges.

BACKGROUND

Integrally stiffened structures such as hat shaped stiffeners and skin structures often require the hat shaped stiffeners to have chamfered flanges to reduce stress concentration at the interface with the skin being reinforced. Undercutting of the plies positioned in the flanges is employed to achieve a chamfered configuration and a configuration to enclose ply edges of the flanges. The enclosing of the ply edges encloses carbon fibers that are exposed at the edge of the plies positioned in the flanges. Fibers such as those constructed of carbon can experience a static charge buildup at the ply edges which then requires the need for sealing, bonding and grounding of the fiber ends so as to allow discharge of the static charge without creating unnecessary electrical transmission risk, particularly in the vicinity of fuel tanks.

Chamfering un-cured composite stiffener flanges can be difficult to achieve in practice and particularly with respect to those that have shallow angles. This process can introduce significant recurring or non-recurring costs through specialized manufacturing processes and/or introduce limitations on the allowable geometry of the stiffener such as e.g. chamfer angle, pre-form thickness, curvature, pad-ups etc. Chamfering un-cured composite flanges of hat stiffeners is typically more difficult to achieve with dry materials compared with pre-impregnated materials and can introduce additional limitations on the allowable geometry such as minimum chamfer angle.

Constructing the flanges to be square and not chamfered is not structurally efficient and may not be compatible with co-curing as a single integrated hat stiffener and skin construction. The square flange edge is also a poor design for facilitating electrical static buildup at the fiber ends that would be exposed on the square edge and would require sealing after fabrication.

Staggering lay-up of individual plies, by way of manual or automated processes, of stiffener pre-forms using staggered ply drops can be used to create undercut chamfered flanges, however, application of these processes typically introduce either significant recurring and/or non-recurring costs. With using a manual process of ply by ply hand lay-up a high recurring cost is incurred. With utilizing an automated process which employs net trim limitation machines, there is a high non-recurring equipment cost which can also include limitations on achievable curvatures, ply ramps and other configurations for subsequent stiffener forming.

Use of post-form trimming for undercutting the chamfer of pre-preg stiffeners has been demonstrated in production for very thin flanges where only a small number of plies are used in the layup. Replication of this process for dry reinforcements has not yet been demonstrated and is likely to be difficult for shallow chamfer angles due to a risk of fraying the edges of the dry fiber plies.

There is a need for a method to provide chamfer undercut configurations for pre-form dry fibers in the manufacture of hat stiffeners used for stiffening reinforcement with respect to a skin structure. The method needs to provide a low cost to the fabrication of chamfered undercut flanges and be versatile to accommodate various needed thicknesses of flanges and various chamfer angles.

SUMMARY

An example includes a method for fabricating a hat stiffener which includes a step of positioning two or more reinforcement fiber layers about a mandrel. The method further includes a step of cutting through the two or more reinforcement fiber layers forming a first stack of first end portions of the two or more reinforcement fiber layers and a second stack of second end portions of the two or more reinforcement fiber layers wherein the first and second stacks are in overlying relationship with respect to the mandrel. In addition the method further includes moving the first stack of the first end portions and the second stack of the second end portions of the two or more reinforcement fiber layers out of overlying relationship with respect to the mandrel.

The features, functions, and advantages that have been discussed can be achieved independently in various embodiments or may be combined in yet other embodiments further details of which can be seen with reference to the following description and drawings.

DESCRIPTION

As has been discussed with respect to integrally stiffened structures, such as a hat stiffener and skin structure, the flanges of hat stiffeners will experience less stress concentration with chamfered edges. Also, with enclosing edges of plies within the flanges of the hat stiffeners an improved performance occurs with respect to preventing electrical static charge build-up of fibers that would otherwise be exposed along the edges of the plies of the flanges. Without enclosing edges of the plies of the flanges of the hat stiffeners, reinforcement fibers are exposed along the edges of the plies which would require a need for sealing, bonding and grounding of the fiber ends so as to allow discharge without creating risk of electrical charge build-up. This is particularly important with respect to flanges of hat stiffeners that are located within the vicinity of fuel tanks.

As a result, there is a need to produce hat stiffeners with under-cut chamfered flanges for purposes of providing less stress concentration and preventing electrical static charge build up along the edges of the plies of the flanges of hat stiffeners. In the interest of cost reductions, there is a need to provide a method which could be adapted to employ automated processes and reduce recurring manual costs and also a need not to require substantial equipment costs.

Figure 1:
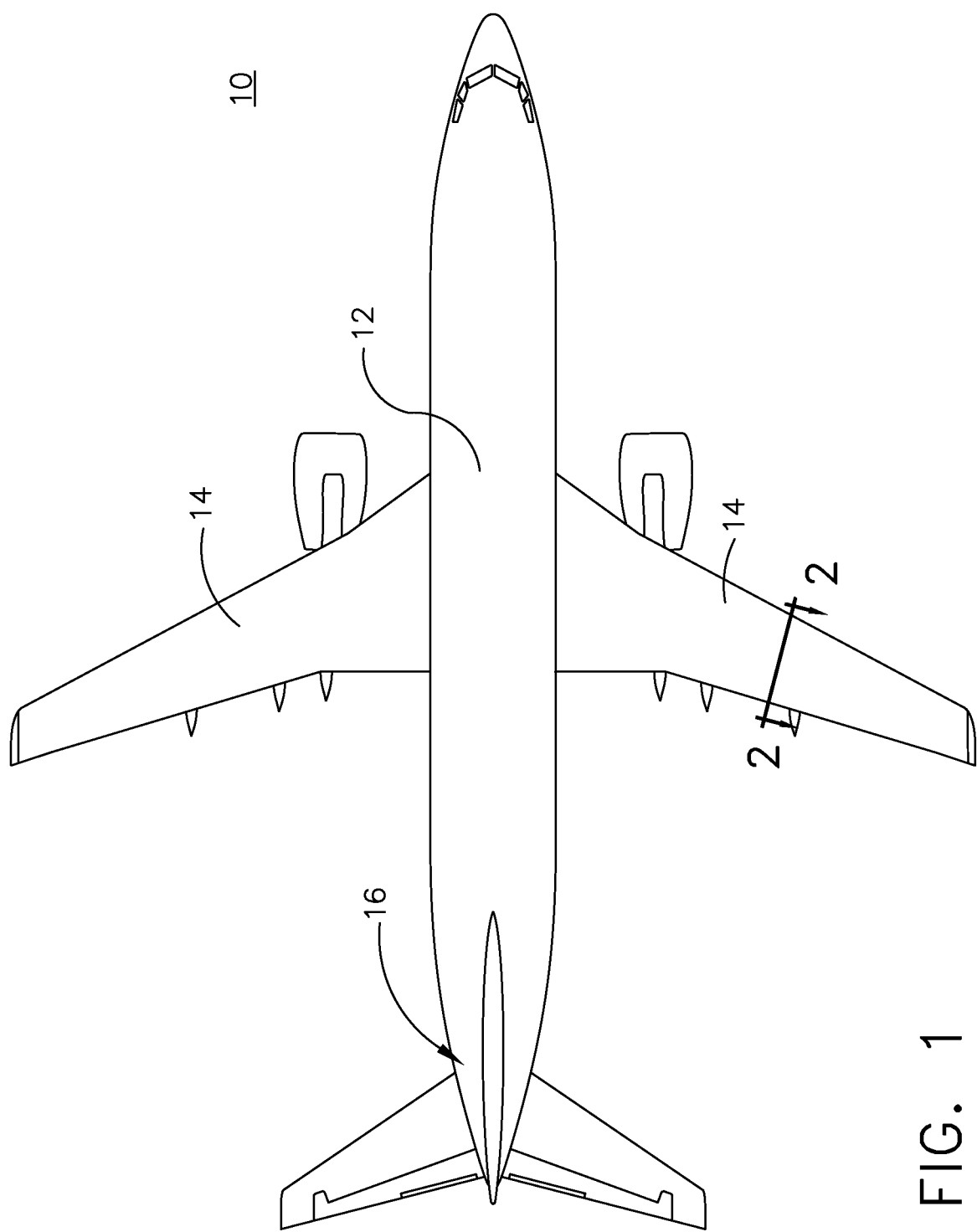
FIG. 1 is a top plan view of an aircraft.
Figure 2:
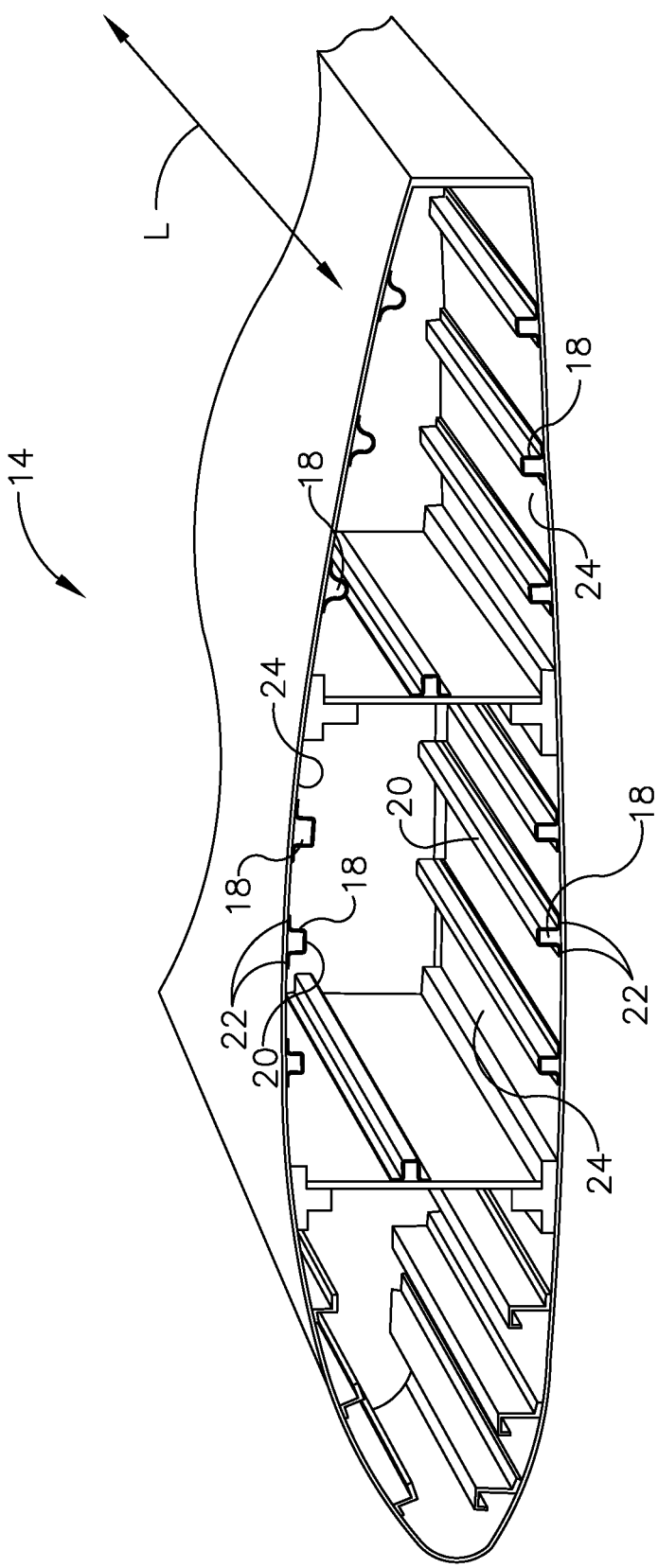
FIG. 2 is a perspective cross section view of a wing of the aircraft taken along line 2-2 in FIG. 1.

In referring to FIG. 1, aircraft 10 is shown with fuselage 12 and wings 14. Hat stiffeners are reinforcement structures often used to reinforce aircraft 10 structures such as a skin of fuselage 12, skin of wings 14 and or tail assembly 16. In this example, a cross section along line 2-2 of wing 14 is shown which provides an example location of an employment of hat stiffeners which can be seen within wing 14. In referring to FIG. 2, hat stiffeners 18 are shown which extend along length L of wing 14. Hat stiffener 18 includes hat portion 20 and flanges 22 extending from opposing sides of hat portion 20 along skin 24, in this example, of wing 14.

In fabricating structural portions of aircraft 10, particularly structural portions which support substantial loadings, hat stiffeners 18 are employed to reinforce such structural portions such as in this example skin 24 of wing 14. It is also beneficial in fabricating these structural portions to utilize co-cure securement such as between reinforcing hat stiffeners 18 and skin 24 of wing 14 to enhance the strength of an integrally formed skin 24 and hat stiffener 18 assembly of wing 14.

Figure 11:
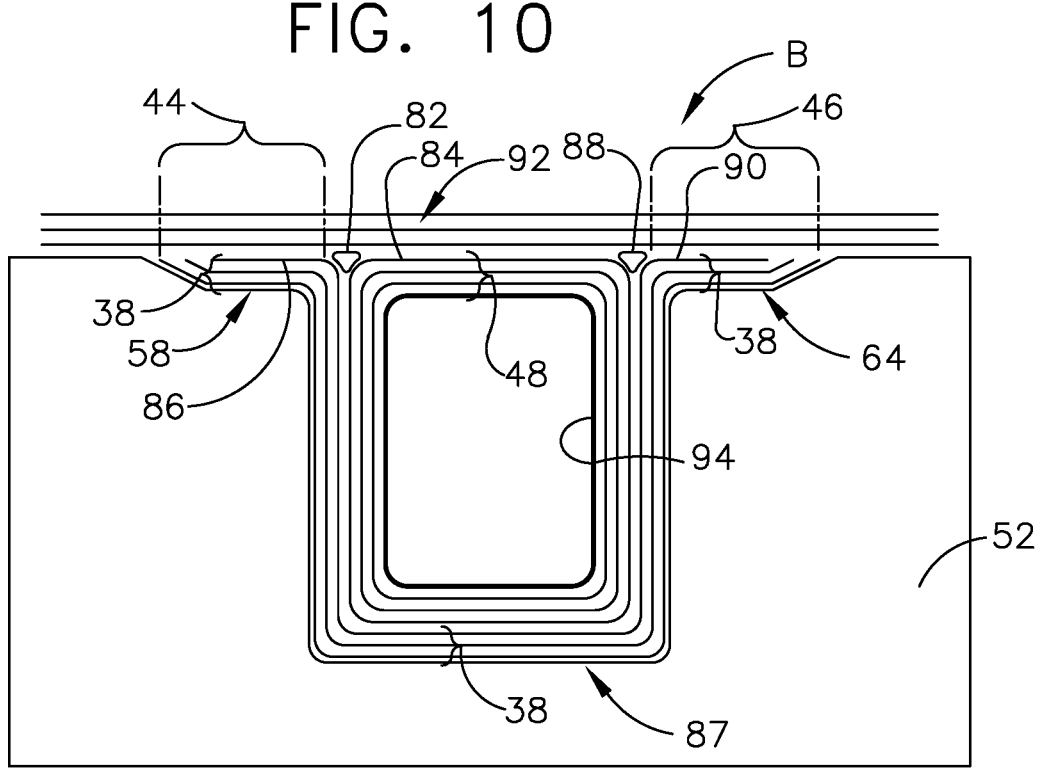
FIG. 11 is the view of FIG. 10 wherein radial filler members and overlying composite skin plies have been installed.
Figure 12:
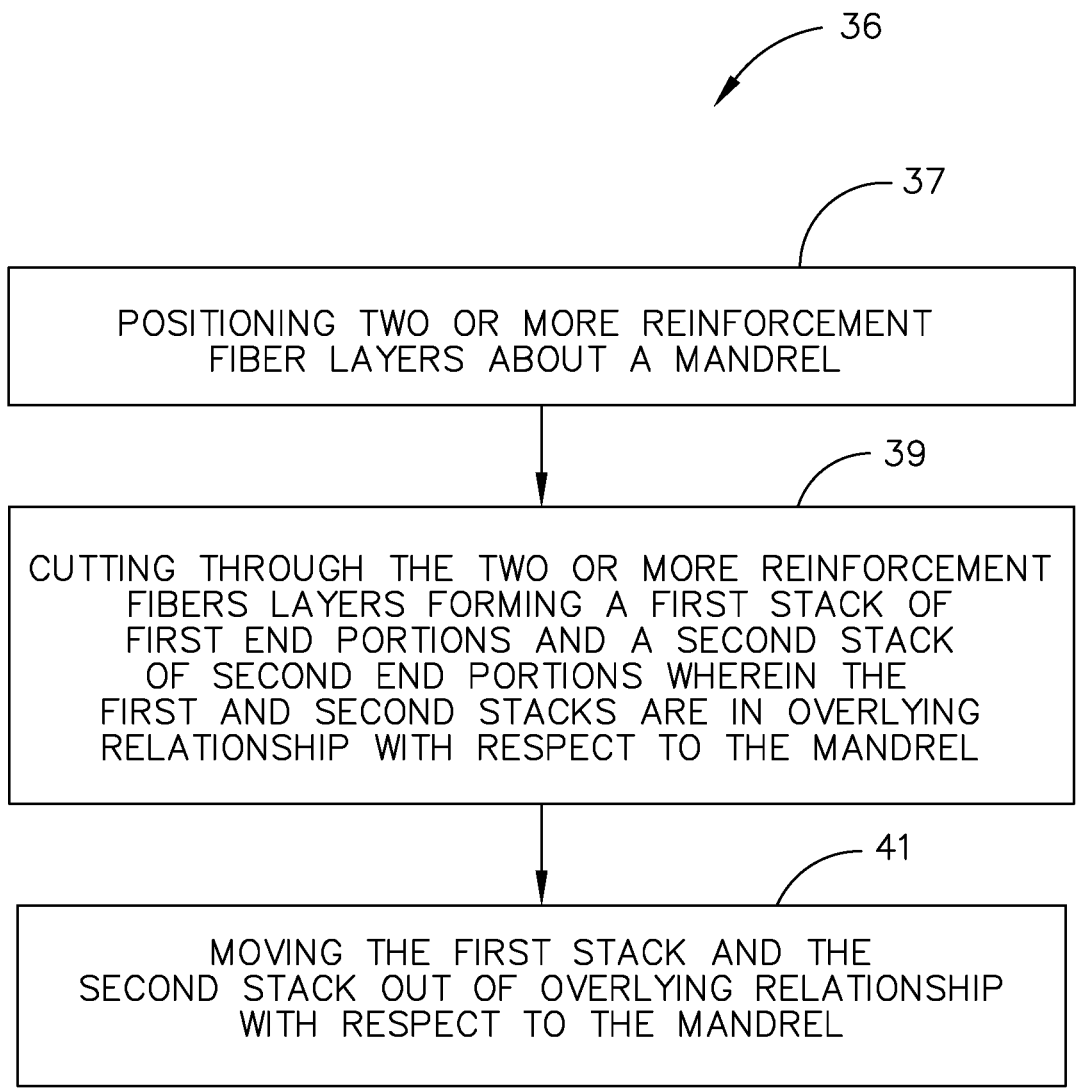
FIG. 12 is a flow chart of a method for fabricating a hat stiffener.

A first embodiment A of method 36 for fabricating hat stiffeners 18, as set forth in FIG. 12, having under-cut chamfered flanges 22 and which is co-cured with skin 24 of wing 14, can be seen in FIGS. 3-6 in this example. A second embodiment B of method 36 for fabricating hat stiffeners 18, as set forth in FIG. 12, having under-cut chamfered flanges 22 and which is co-cured with skin 24, can be seen in FIGS. 7-11, in this example.

Figure 3:
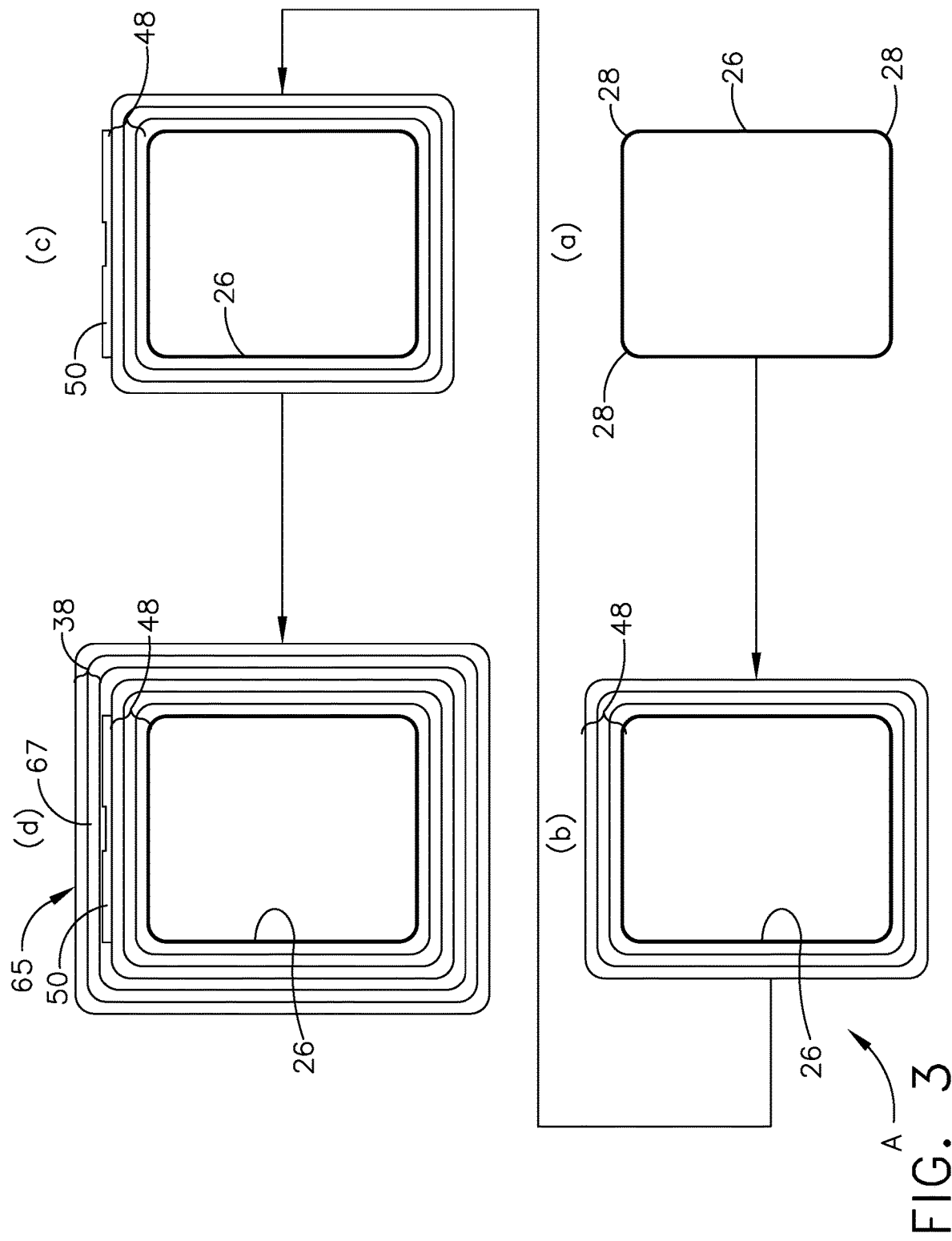
FIG. 3 is a schematic cross section view of a mandrel showing successive steps within a first embodiment of a method for fabricating a hat stiffener including positioning reinforcement fiber layers about the mandrel and with the positioning a cutting plate between two adjacent reinforcement fiber layers completing a mandrel assembly.

With respect to first embodiment A of method 36 for fabricating hat stiffener 18 mandrel 26 is provided in FIG. 3 at (a). Mandrel 26 can be constructed of one of a number of shapes and in this example is a trapezoidal or rectangular shaped mandrel 26 with rounded or radial corners 28 is employed. Mandrel 26 can be constructed of a strong enough material such as metal, composite, rubber, silicone or ceramic material so as to support a plurality of plies of composite material without experiencing detrimental deformation to the shape of mandrel 26 through a curing process. With respect to second embodiment B of method 36 for fabricating hat stiffener 18 mandrel 30 is provided in FIG. 7 at (a). Mandrel 30 can be constructed of one of a number of shapes and in this example is a trapezoidal or rectangular shaped mandrel 30 with rounded or radial corners 32 having cutting notch 34 is employed. Mandrel 30, as mentioned for mandrel 26, can be constructed of a strong material such as metal, ceramic, composite material or a hollow and pressurized rubber or silicone material so as to support a plurality of plies of composite material without experiencing detrimental deformation to the shape of mandrel 30 up through a curing process.

Prior to discussing further detailed steps taken with respect to implementing each of first embodiment A and second embodiment B for method 36 for fabricating hat stiffeners 18, as seen in FIG. 12 which have under-cut and chamfered flanges 22, common steps for fabricating hat stiffener 18 to both first embodiment A and second embodiment B will be discussed. These steps provide an inexpensive and reliable approach in fabricating under-cut chamfered flanges for hat stiffeners 18.

Figure 4:
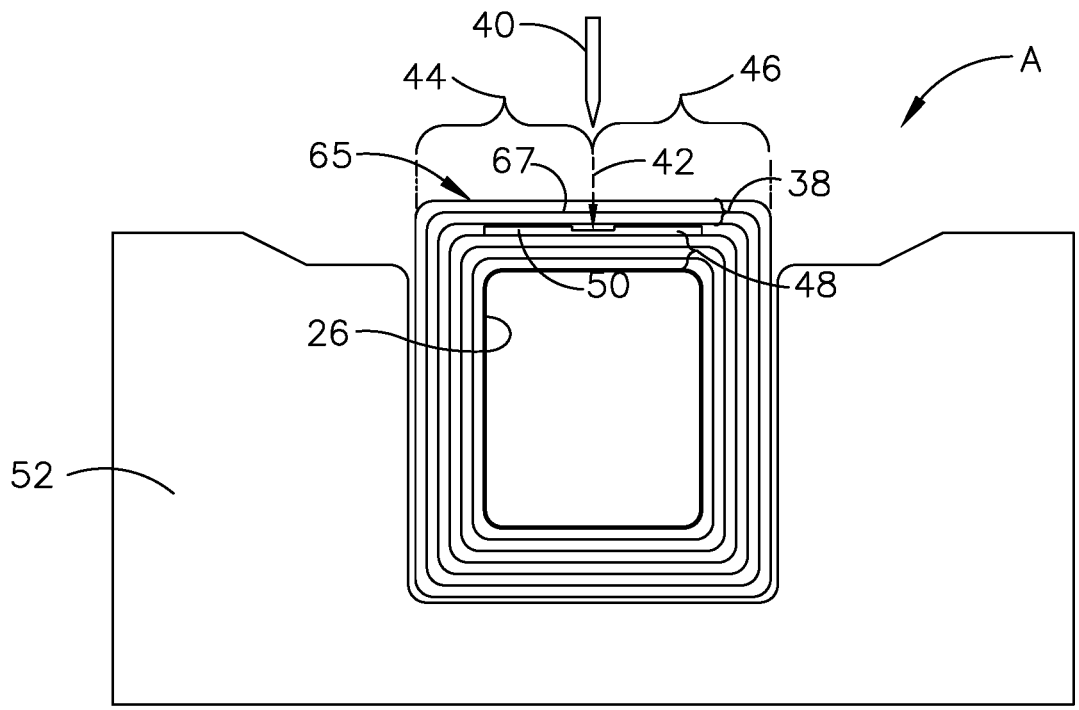
FIG. 4 is the mandrel assembly of FIG. 3 positioned within a support tool for cutting.
Figure 5:
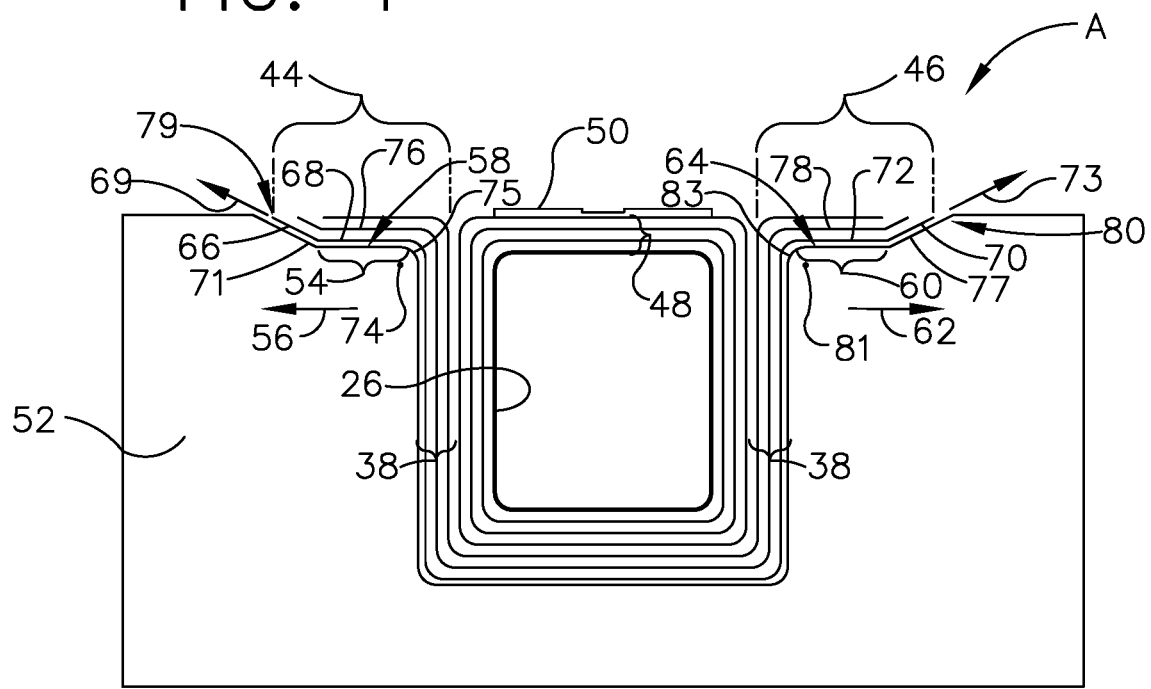
FIG. 5 is a view of FIG. 4 wherein two or more reinforcement fiber layers have been cut forming a first stack of first end portions of reinforcement fiber layers and a second stack of second end portions of the reinforcement fiber layers wherein the first and second stacks have been moved out of overlying relationship with respect to the mandrel.

With respect to first embodiment A, in referring to FIG. 3 at (d) and 12, method 36 for fabricating hat stiffener 18 includes step 37 for positioning two or more reinforcement fiber layers 38 about mandrel 26. With fiber layers 38 in position, method 36 includes step 39 for cutting through two more reinforcement fiber layers 38 with cutting tool 40 as seen in FIG. 4 resulting in a cut line 42 extending through fiber layers 38. With fiber layers 38 cut along a cut line 42, first stack of first end portions 44 of the two or more reinforcement fiber layers 38 is formed and second stack of second end portions 46 of the two or more reinforcement fiber layers 38 is also formed. Both first stack of first end portions 44 and second stack of second end portions 46 are in overlying relationship with respect to mandrel 26, as seen in FIG. 4. Method 36 further includes step 41 for moving first stack of first end portions 44 and second stack of second end portions 46 of the two or more reinforcement fiber layers 38 out of overlying relationship with respect to mandrel 26, as seen for example in FIG. 5. As will be discussed in more detail herein, first stack of first end portions 44 and second stack of second end portions 46 of two or more reinforcement fiber layers 38 are positioned, as seen in FIG. 5, forming fiber layers for flanges 22 of hat stiffener 18 which in this example will be constructed by way of infusion and curing and which will be discussed in further detail herein. By way of employing method 36, flanges 22 will be chamfered and under-cut such that edges of resulting plies will be enclosed within completed flanges 22.

Figure 7:
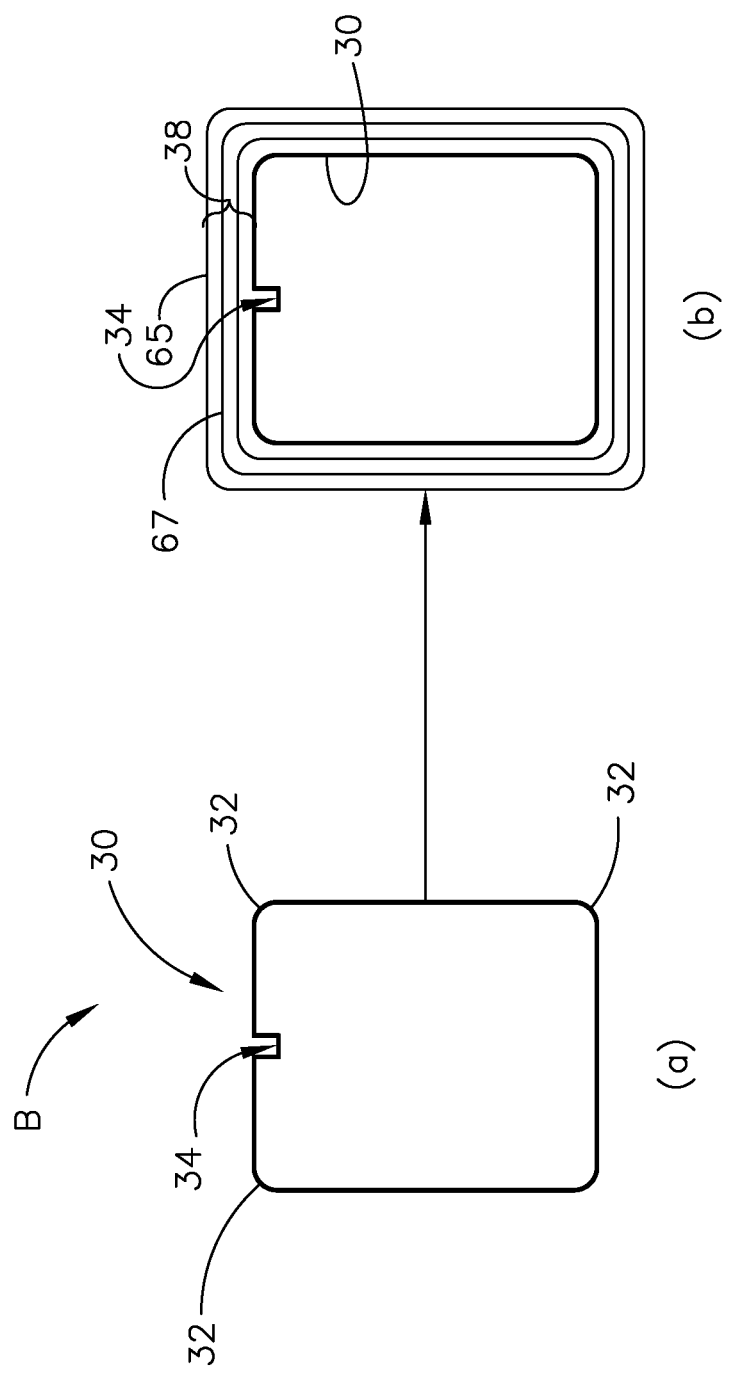
FIG. 7 is a schematic cross section view of another mandrel showing a step within a second embodiment of a method for fabricating a hat stiffener including positioning reinforcement fiber layers about the mandrel completing a mandrel assembly.
Figure 8:
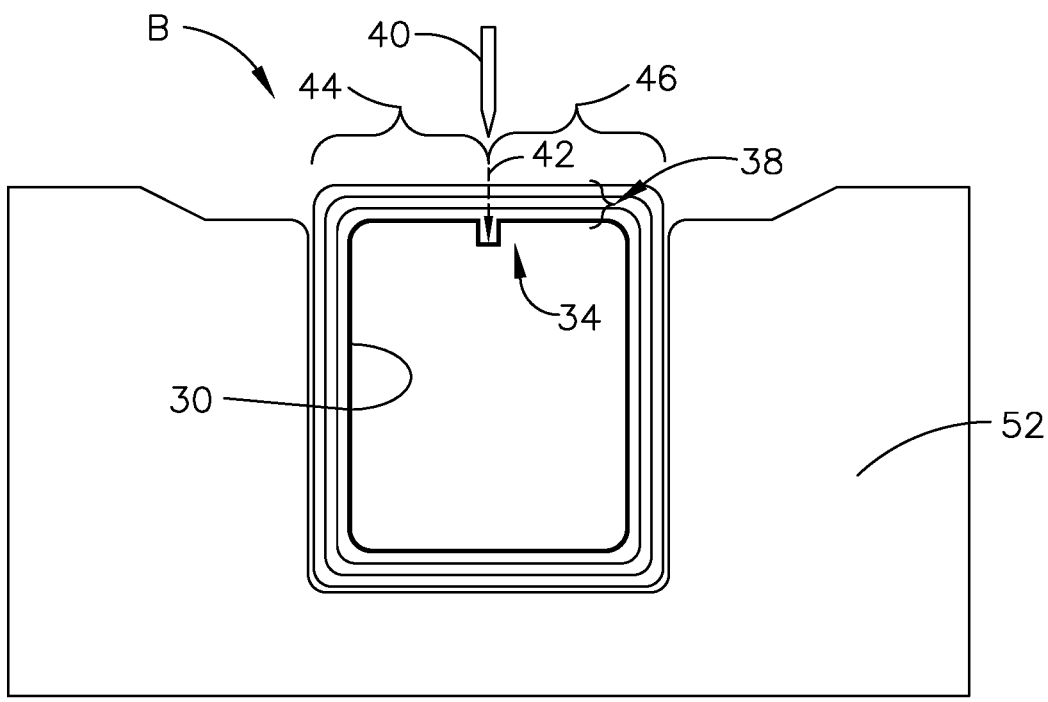
FIG. 8 is the mandrel assembly of FIG. 7 positioned within a support tool for cutting.
Figure 9:
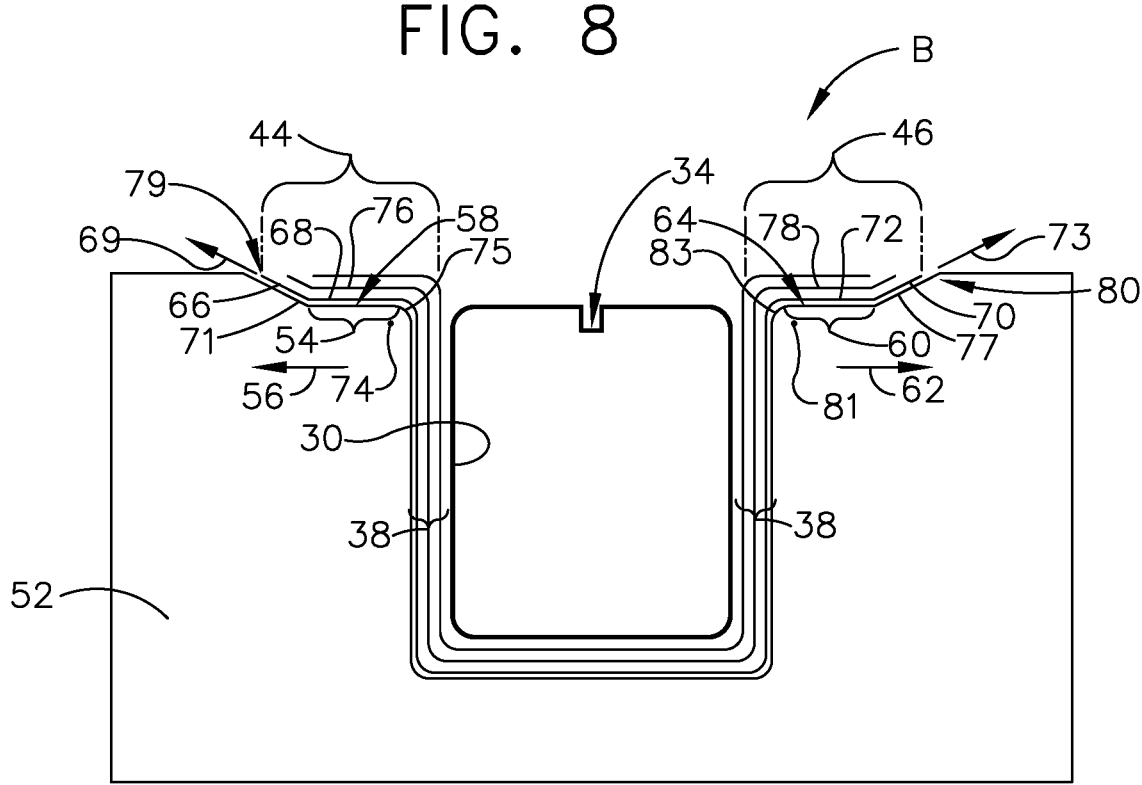
FIG. 9 is the view of FIG. 8 wherein two or more layers of reinforcement fibers have been cut into a first stack of first end portions of the reinforcement fiber layers and a second stack of second end portions of the reinforcement fiber layers the first and second stacks have been moved out of overlying relationship with respect to the mandrel.

With respect to second method embodiment B, in referring to FIG. 7 at (b) and 12, method 36 for fabricating hat stiffener 18 includes step 37 of positioning two or more reinforcement fiber layers 38 about mandrel 30. With fiber layers 38 in position, method 36 includes step 39 of cutting through two more reinforcement fiber layers 38 with cutting tool 40 as seen in FIG. 8 resulting in a cut line 42 extending through fiber layers 38. With fiber layers 38 cut along cut line 42, first stack of first end portions 44 of the two or more reinforcement fiber layers 38 is formed and second stack of second end portions 46 of the two or more reinforcement fiber layers 38 is also formed. Both first stack of first end portions 44 and second stack of second end portions 46 are in overlying relationship with respect to mandrel 30, as seen in FIG. 8. Method 36 further includes moving first stack of first end portions 44 and second stack of second end portions 46 of the two or more reinforcement fiber layers 38 out of overlying relationship with respect to mandrel 30, as seen for example in FIG. 9. As will be discussed in more detail herein, first stack of first end portions 44 and second stack of second end portions 46 of two or more reinforcement fiber layers 38 are positioned as seen in FIG. 9, forming fiber layers for flanges 22 of hat stiffener 18 which in this example will be constructed by way of infusion and curing and which will be discussed in further detail herein. By way of employing method 36, flanges 22 will be chamfered and under-cut such that edges of resulting plies will be enclosed within completed flanges 22.

In referring to FIGS. 3-6 and 12 for first embodiment A for method 36 step 37 for positioning two or more reinforcement fiber layers 38 about mandrel 26 and further includes, in this example, two or more reinforcement fiber layers 38 being braided (not shown) and the two or more reinforcement fiber layers 38 being concentrically arranged about mandrel 26, as seen in FIG. 3 at (d). Reinforcement fiber layers can be arranged any one of a number of configurations including braided and filament wound and constructed of one of a number of materials such as carbon, glass, aramid and Kevlar fibers. In this example, a carbon fiber is used and is braided arrangement of the fibers is utilized with use of an automated braiding machine wherein the concentrically positioned layers can be braided directly onto mandrel 26. Alternatively, the braided layers can be braided separate and apart from mandrel 26 and then subsequently mounted onto mandrel 26. In either arrangement, application of automated equipment can readily be applied for step 37 for positioning two or more reinforcement fiber layers 38 onto mandrel 26.

In further referring to FIG. 3, step 37 for positioning the two or more reinforcement fiber layers 38 further includes positioning at least one additional reinforcement fiber layer 48, as seen at (b)-(d) in FIG. 3. At least one additional reinforcement fiber layer 48, in this example includes a plurality of additional reinforcement fiber layers 48 which are positioned about mandrel 26 and, as seen at (d) in FIG. 3, are positioned between the at least two or more reinforcement fiber layers 38 and mandrel 26. In this example, the at least one additional reinforcement fiber layer 48 is positioned about mandrel 26 as seen at (b) in FIG. 3 prior to positioning the two or more reinforcement fiber layers 38 about mandrel 26 as seen at (d) in FIG. 3. Step 37 of positioning the two or more reinforcement fiber layers 38 further includes positioning cutting plate 50, as seen at (c) in FIG. 3 which results in cutting plate 50 being positioned in this example between the two or more reinforcement fiber layers 38 and the at least one additional reinforcement fiber layer 48 as seen at (d) in FIG. 3. Cutting plate 50 is constructed of a strong material such as a metal or a composite that will receive an impact from cutting tool 40 and prevent any damage occurring to the at least one additional reinforcement layer 48 positioned underlying cutting plate 50.

In referring to FIGS. 4 and 12, method 36 further includes in this example step 37 of positioning mandrel 26 with the two or more reinforcement fiber layers 38, cutting plate 50 and the at least one additional reinforcement fiber layer 48 into supporting tool 52. Method 36 further includes step 39 of cutting through the two or more reinforcement fiber layers 38 wherein cutting the two or more reinforcement fiber layers 38 is in alignment with cutting plate 50 as seen in FIG. 4 and shown with resulting cut line 42.

In referring to FIGS. 5 and 12, step 41 for moving first stack of the first end portions 44 and the second stack of the second end portions 46 includes positioning portion 54 of first stack of first end portions 44 to extend in first direction 56 overlying first portion 58 of supporting tool 52. Step 41 further includes positioning portion 60 of second stack of second end portions 46 to extend in second direction 62 overlying second portion 64 of supporting tool 52, wherein first and second directions 56, 62 extend in opposite directions to one another. Step 41 for moving first stack of the first end portions 44 and the second stack of the second end portions 46 further includes positioning first end section 66 of at least one layer 68 of first stack of the first end portions 44 wherein first end section 66 extends in direction 69 in an angular relationship with respect to first direction 56. This angular extending of first end section 66 is facilitated by angular wall 71 of support tool 52. Similarly, step 41 also includes positioning second end section 70 of the at least one layer 72 of second stack of the second end portions 46 in direction 73 in an angular relationship with respect to second direction 62. This angular extending of second end section 70 is facilitated by angular wall 77 of support tool 52.

With each reinforcement fiber layer within the at least two reinforcement fiber layers 38 being concentric to one another, as seen in FIG. 3 at (d) and 4, the length of each reinforcement fiber layer increases as each layer is positioned further away from mandrel 26. Thus, the at least one layer 68 of first stack 44 was previously positioned furthest from mandrel 26 as part of layer 65, as seen in FIG. 3 at (d) and 4, prior to cutting of the two or more reinforcement fiber layers 38. Thus the at least one layer 68 in first stack 44 is part of the longest layer 65 within the two or more reinforcement fiber layers 38 and at least one layer 68 extends further along support tool 52 than layer 76 of first stack 44 which was part of the second longest layer 67 as seen in FIG. 3 at (d) and 4. As the two or more reinforcement fiber layers 38 were cut, and positioned within first stack 44, as seen in FIG. 5, the layers positioned further above supporting tool 52 extend a shorter distance along support tool 52. As a result, a chamfer configuration is imparted to edge 79 of first stack 44 resulting in corresponding flange 22 of hat stiffener 18 being chamfered.

With the cut having been made through the two or more reinforcement fiber layers 38, first stack 44 is moved out of overlying relationship with respect to mandrel 26, as seen in FIG. 5. The layers within first stack 44 bend around a center of radius 74 associated with curve 75 of supporting tool 52, as seen in FIG. 5, and extend to form the chamfered edge 79 as described above.

Reinforcement fiber layers within the two or more reinforcement fiber layers 38 are concentrically positioned with respect to one another, as seen in FIG. 3 at (d) and 4 as described above. The length of each reinforcement fiber layer increases as each layer is positioned further away from mandrel 26. Thus, the at least one layer 72 of second stack 46 was previously positioned furthest from mandrel 26 as part of layer 65 as seen in FIG. 3 at (d) and 4 prior to cutting of the two or more reinforcement fiber layers 38. Thus the at least one layer 72 in second stack 46 is part of the longest layer 65 within the at least two reinforcement fiber layers 38 and extends further along support tool 52 than layer 78 of second stack 46 which was part of the second longest layer 67 as seen in FIG. 3 at (d) and 4. As the two or more reinforcement fiber layers 38 were cut, and positioned within second stack 46, as seen in FIG. 5, the layers positioned further above supporting tool 52 extend a shorter distance along support tool 52. As a result, a chamfer configuration is imparted to edge 80 of second stack 46 resulting in corresponding flange 22 of hat stiffener 18 being chamfered.

With the cut having been made through the at least two reinforcement fiber layers 38, second stack 46 is moved out of overlying relationship with respect to mandrel 26. The layers in second stack 46 bend around a center of radius 81 associated with curved angular wall 83 of supporting tool 52, as seen in FIG. 5, and extend to form the chamfered edge 80 as described above.

With respect to at least one layer 68 in first stack of first end portions 44 and at least one layer 72 in the second stack of second end portions 46, each of these, as described above, have first and second end sections 66, 70 respectively which extend in directions 69 and 73 respectively. With directions 69 and 73 extending in angular relationship with respect to first direction 56 and second direction 62 respectively and with the at least one layer 68 and at least one layer 72 extending longer along support tool 52 than other layers within first stack 44 and second stack 46 respectively, at least one layer 68 and at least one layer 72 enclose the remaining layers within first stack 44 and second stack 46 respectively. As a result, fibers positioned in the enclosed layers of first stack 44 and second stack 46 are not exposed outside of edge 79 of first stack 44 or outside of edge 80 of second stack 46. This construction will prevent fibers from being exposed at edges of flanges 22 of hat stiffener 18 and prevent electrical static charge build-up occurring at either edge 79 or 80 of what will result as flanges 22 of hat stiffener 18.

With step 39 for cutting through the two or more reinforcement fiber layers 38, which can be implemented with an automated process, first stack of first end portions 44 and second stack of second end portions 46 are formed. Further included in method 36 is a step of removing cutting plate 50 which can be implemented so as to permit step 41 for moving first stack 44 and second stack 46 out of overlying relationship with respect to mandrel 26 can be implemented. In this example, the step of removing cutting plate 50 and step for moving first stack 44 and second stack 46 out of overlying relationship with respect to mandrel 26 can be facilitated in an automated process wherein an inflatable bladder (not shown) can be positioned beneath cutting plate 50, for example, such that the bladder is protected from cutting tool 40, and then inflated upon the completion of the cutting of the two or more reinforcement fiber layers 38 positioned above cutting plate 50. With the inflation of the bladder, cutting plate 50 can be removed away from support tool 52 and first and second stacks 44, 46 can be moved from overlying relationship with respect to mandrel 26 and positioned in overlying relationship with support tool 52 as seen in FIG. 6.

Figure 6:
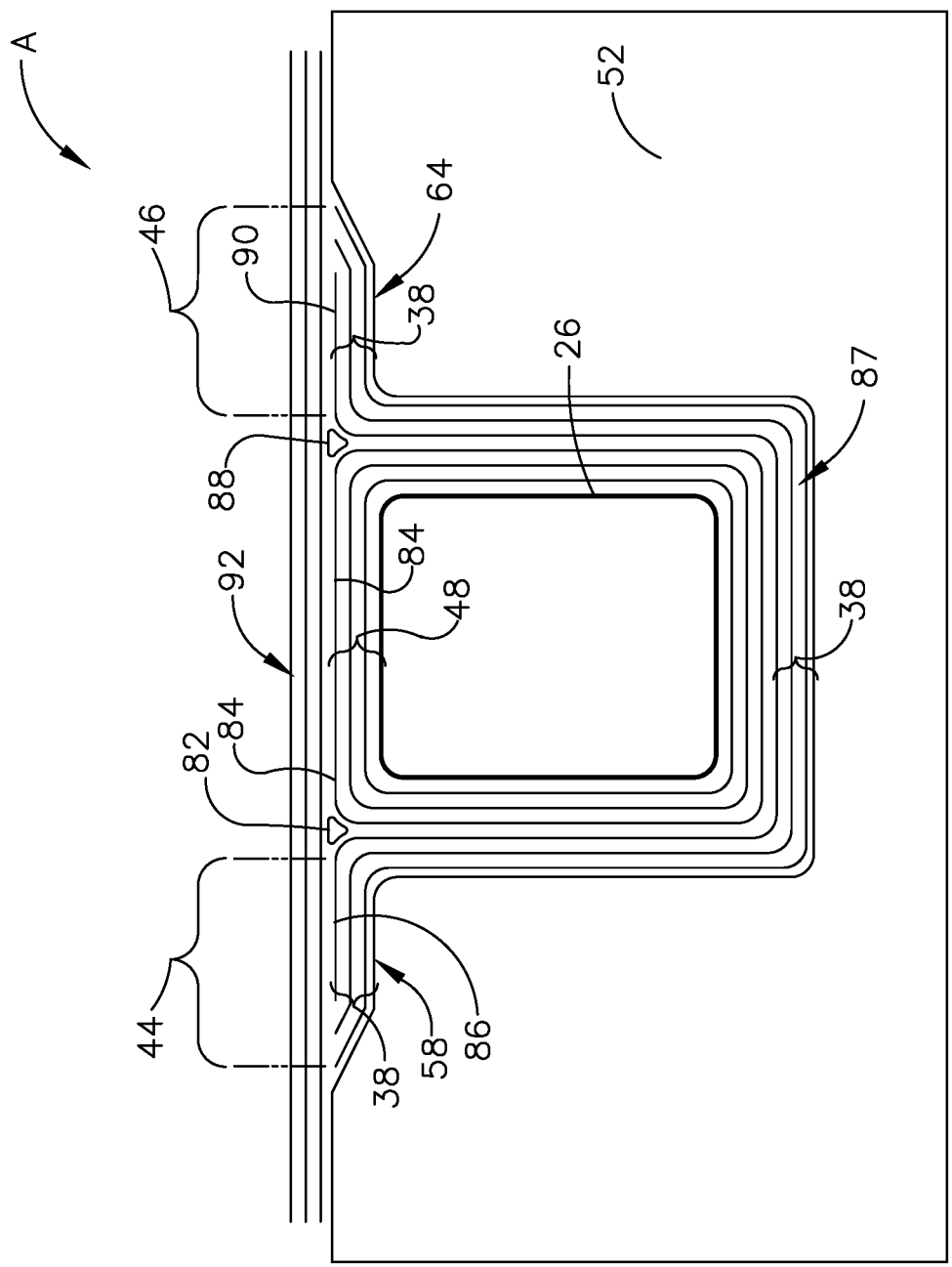
FIG. 6 is a view of FIG. 5 wherein the cutting plate has been removed and radial filler members and overlying composite skin plies have been installed.

With cutting plate 50 removed and first stack of first end portions 44 and second stack of second end portions 46 moved into overlying relationship with support tool as seen in FIG. 6, method 36 for fabricating hat stiffener 18 further includes, in this example, a step of positioning first radial filler member 82 adjacent to last layer 84 of the at least one additional reinforcement fiber layer 48 and adjacent to last layer 86 of first stack of first end portions 44 of two or more reinforcement fiber layers 38. In this example, last layer 84 is the reinforcement fiber layer within the at least one additional reinforcement fiber layer 48 positioned the furthest from mandrel 26 and last layer 86 of the first stack of first end portions 44 is the reinforcement fiber layer within first stack of first end portions 44 positioned furthest from first portion 58 of supporting tool 52. In this example, further included is a step of positioning second radial filler member 88 adjacent to last layer 84 of the at least one additional reinforcement fiber layer 48 and adjacent to last layer 90 of the second stack of second end portions 46 of two or more reinforcement fiber layers 38. In this example, last layer 84, as mentioned above, is the reinforcement fiber layer within the at least one additional reinforcement fiber layer 48 positioned the furthest from mandrel 26 and last layer 90 of the second stack of first end portions 46 is the reinforcement fiber layer of second stack of second end portions 46 of the two or more reinforcement fiber layers 38 positioned furthest from second portion 64 of supporting tool 52.

Method 36 for fabricating hat stiffener 18 further includes a step of positioning at least one composite skin ply 92 in an overlying position related to the first stack of first end portions 44 of the two or more reinforcement fiber layers 38, second stack of second end portions 46 of the two or more reinforcement fiber layers 38, the first and second radial filler members 82, 88 and the last layer 84 of at least one additional reinforcement fiber layer 48. In this example, a plurality of layers are employed within the at least one additional reinforcement fiber layer 48 and a plurality of layers are employed within the at least one composite skin ply 92.

Further included in method 36 is a step of infusing a resin into within a preform assembly which includes: the first stack of first end portions 44 of the two or more reinforcement fiber layers 38, second stack of second end portions 46 of the two or more reinforcement fiber layers 38, a remainder 87 of the two or more reinforcement fiber layers 48 positioned between first stack of first end portions 44 and second stack of second end portions 46, the first and second radial filler members 82, 88 and the at least one additional reinforcement fiber layer 48.

Method 36 for fabricating hat stiffener 18 also includes a step of co-curing the infused preform assembly which includes: first stack of first end portions 44 of the two or more reinforcement fiber layers 38, second stack of second end portions 46 of the two or more reinforcement fiber layers 38, the remainder 87 of the two or more reinforcement fiber layers 38 positioned between first stack of first end portions 44 and second stack of second end portions 46, the first and second radial filler members 82, 88, and the at least one additional reinforcement fiber layer 48, with the at least one composite skin ply 92, resulting in the fabrication of hat stiffener 18 with under-cut and chamfered flanges co-cured with at least one composite skin ply 92 of skin 24.

In referring to FIGS. 7-11, steps of second embodiment B of method 36 for fabricating hat stiffener 18 can be seen. As earlier discussed, mandrel 30 with cutting notch 34 is shown in FIG. 7 at (a) and is employed in fabricating hat stiffener 18 with under-cut chamfered flanges 22. Step 37 of positioning two or more reinforcement fiber layers 38 about mandrel 30 is shown in FIG. 7 at (b). As seen in FIG. 7 at (b), step 37 of positioning two or more reinforcement fiber layers 38 about mandrel 30 further includes positioning two or more reinforcement fiber layers 38 in overlying relationship to cutting notch 34 positioned on mandrel 30 is shown. Additionally included is a step of positioning mandrel 30 and the two or more reinforcement fiber layers into supporting tool 52, as seen in FIG. 8.

With completion of step 39 of cutting through two or more reinforcement fiber layers 38 with cutting tool 40, cut line 42 through fiber layers 38, as shown in FIG. 8, first stack of first end portions 44 of two or more reinforcement fiber layers 38 and second stack of second end portions 46 of two or more reinforcement fiber layers 38 are formed and which are in overlying relationship with respect to mandrel 30. In referring to FIG. 9, step 41 of moving first stack of the first end portions 44 and second stack of the second end portions 46 includes positioning portion 54 of first stack of first end portions 44 of two or more reinforcement fiber layers 38 to extend in first direction 56 overlying first portion 58 of supporting tool 52. Step 41 further includes positioning portion 60 of second stack of second end portions 46 of two or more reinforcement fiber layers 38 to extend in second direction 62 overlying second portion 64 of supporting tool 52 wherein first and second directions 56, 62 extend in opposite directions to one another.

In referring to FIG. 9, step 41 of moving the first stack of first end portions 44 and the second stack of second end portions 46 of the two or more reinforcement fiber layers 38 further includes first end section 66 extending in direction 69 in an angular relationship with respect to first direction 56. This angular extending of first end section 66 is facilitated by angular wall 71 of support tool 52. Similarly, step 41 also includes positioning second end section 70 of the at least one layer 72 of second stack of the second end portions 46 to extend in direction 73 in an angular relationship with respect to second direction 62. This angular extending of second end section 70 is facilitated by angular wall 77 of support tool 52.

With each reinforcement fiber layer within the at least two reinforcement fiber layers 38 being concentric to one another, as seen in FIG. 7 at (b), the length of each reinforcement fiber layer increases as each layer is positioned further away from mandrel 30. Thus, the at least one layer 68 of first stack 44 was previously positioned furthest from mandrel 30 as part of layer 65, as seen in FIG. 7 at (b), prior to cutting of the two or more reinforcement fiber layers 38. Thus the at least one layer 68 in first stack 44 is part of the longest layer 65 within the two or more reinforcement fiber layers 38 and at least one layer 68 extends further along support tool 52 than layer 76 of first stack 44 which was part of the second longest layer 67 as seen in FIG. 7 at (b). As the two or more reinforcement fiber layers 38 were cut, and positioned within first stack 44, as seen in FIG. 9, the layers positioned further above supporting tool 52 extend a shorter distance along support tool 52. As a result, a chamfer configuration is imparted to edge 79 of first stack 44 resulting in corresponding flange 22 to be constructed of hat stiffener 18 being chamfered.

With the cut having been made through the two or more reinforcement fiber layers 38, first stack 44 is moved out of overlying relationship with respect to mandrel 26, as seen in FIG. 9. The layers within first stack 44 bend around a center of radius 74 associated with curve 75 of supporting tool 52, as seen in FIG. 9, and extend to form the chamfered edge 79 as described above.

Reinforcement fiber layers within the two or more reinforcement fiber layers 38 are concentrically positioned with respect to one another, as seen in FIG. 7 at (b) as described above. The length of each reinforcement fiber layer increases as each layer is positioned further away from mandrel 30. Thus, the at least one layer 72 of second stack 46 was previously positioned furthest from mandrel 26 as part of layer 65 as seen in FIG. 3 at (d) and 4 prior to cutting of the two or more reinforcement fiber layers 38. Thus the at least one layer 72 in second stack 46 is part of the longest layer 65 within the at least two reinforcement fiber layers 38 and extends further along support tool 52 than layer 78 of second stack 46 which was part of the second longest layer 67 as seen in FIG. 7 at (d). As the two or more reinforcement fiber layers 38 were cut, and positioned within second stack 46, as seen in FIG. 9, the layers positioned further above supporting tool 52 extend a shorter distance along support tool 52. As a result, a chamfer configuration is imparted to edge 80 of second stack 46 resulting in corresponding flange 22 to be constructed of hat stiffener 18 being chamfered.

With the cut having been made through the at least two reinforcement fiber layers 38, second stack 46 is moved out of overlying relationship with respect to mandrel 30. The layers in second stack 46 bend around a center of radius 81 associated with curved angular wall 83 of supporting tool 52, as seen in FIG. 9, and extend to form the chamfered edge 80 as described above.

With respect to at least one layer 68 in first stack of first end portions 44 and at least one layer 72 in the second stack of second end portions 46, each of these, as described above, have first and second end sections 66, 70 respectively which extend in directions 69 and 73 respectively. With directions 69 and 73 extending in angular relationship with respect to first direction 56 and second direction 62 respectively and with the at least one layer 68 and at least one layer 72 extending longer along support tool 52 than other layers within first stack 44 and second stack 46 respectively, at least one layer 68 and at least one layer 72 enclose the remaining layers within first stack 44 and second stack 46 respectively. As a result, fibers positioned in the enclosed layers of first stack 44 and second stack 46 are not exposed outside of edge 79 of first stack 44 or outside of edge 80 of second stack 46. This construction will prevent reinforcement fibers from being exposed at edges of flanges 22 of hat stiffener 18 and prevent electrical static charge build-up at either edges 79 or 80 of what will result as flanges 22 of hat stiffener 18.

In second embodiment B of method 36, automated processes can be employed for both cutting two or more reinforcement fiber layers 38 with cutting tool 40 and moving first stack of first end portions 44 and second stack of second end portions 46 with an inflatable bladder as discussed earlier for first embodiment A.

Figure 10:
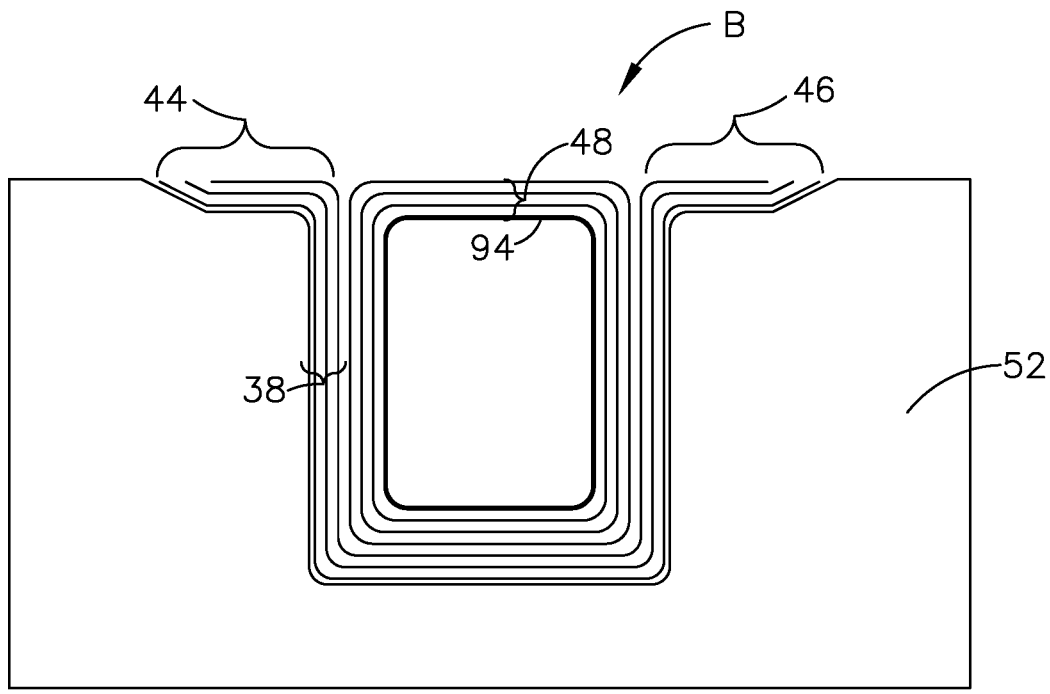
FIG. 10 is the view of FIG. 9 wherein the mandrel of FIG. 9 has been removed from the supporting tool and a second mandrel with additional reinforcement fiber layers positioned about the second mandrel has been inserted within the support tool.

In referring to FIG. 9, method 36 further includes in second embodiment B a step of removing mandrel 30 from supporting tool 52. Further included is a step of positioning at least one additional reinforcement fiber layer 48 about a second mandrel 94 (not shown). This application of at least one additional reinforcement fiber layer 48 can include as in this example automated braiding of at least one additional reinforcement fiber layer 48 onto second mandrel 94 or alternatively braiding at least one additional reinforcement fiber layer 48 separate and apart from second mandrel 94 and positioning the at least one additional reinforcement fiber layer 48 onto second mandrel 94. Different configurations and materials can be used in the construction of fiber layer 48 can be employed as was earlier discussed with respect to two or more reinforcement fiber layers 38. In this example, a plurality of reinforcement fiber layers are employed in the at least one additional reinforcement fiber layer 48. Method 36 further includes positioning second mandrel 94 with at least one additional reinforcement fiber layer 48 into supporting tool 52, as seen in FIG. 10.

In referring to FIG. 11, method 36 further includes a step of positioning first radial filler member 82 adjacent to last layer 84 of the at least one additional reinforcement fiber layer 48 and adjacent to last layer 86 of first stack of the first end portions 44 of the two or more reinforcement fiber layers 38. Method 36 further includes a step of positioning second radial filler member 88 adjacent to last layer 84 of the at least one additional reinforcement fiber layer 48 and adjacent to last layer 90 of second stack of the second end portions 46 of the two or more reinforcement fiber layers 38.

Method 36 further includes a step of positioning at least one composite skin ply 92 in an overlying position related to first stack of first end portions 44 of the two or more reinforcement fiber layers 38, the second stack of second end portions 46 of the two or more reinforcement fiber layers 38, the first and second radial filler members 82, 88 and last layer 84 of the at least one additional reinforcement fiber layer 48. Method 36 further includes a step of infusing a resin within a preform assembly which includes: at least one additional reinforcement fiber layer 48, the first and second radial filler members 82, 88, the first stack of first end portions 44 of the two or more reinforcement fiber layer 38, the second stack of the second end portions 46 of the two or more reinforcement fiber layers 38 and a remainder 87 of the two or more reinforcement fiber layers 38 positioned between first stack of the first end portions 44 and second stack of the second end portions 46. Once the infusion of resin is complete, method 36 further includes co-curing the infused preform assembly which includes: at least one additional reinforcement fiber layer 48, the first and second radial filler members 82, 88, the first stack of the first end portions 44 of the two or more reinforcement fiber layers 38, the second stack of the second end portions 46 of the two or more reinforcement fiber layers 38, the remainder 87 of the two or more reinforcement fiber layers 38 positioned between first stack of the first end portions 44 and second stack of the second end portions 46, with the at least one composite skin ply 92.

While various embodiments have been described above, this disclosure is not intended to be limited thereto. Variations can be made to the disclosed embodiments that are still within the scope of the appended claims.

What is claimed:

1. A method for fabricating a hat stiffener, comprising steps of:
    positioning two or more reinforcement fiber layers about a mandrel, further including:
        positioning at least one additional reinforcement fiber layer about the mandrel positioned between the at least two or more reinforcement fiber layers and the mandrel; and
        positioning a cutting plate positioned between the at least two or more reinforcement fiber layers and the at least one additional reinforcement fiber layer; and
    cutting through the two or more reinforcement fiber layers forming a first stack of first end portions of the two or more reinforcement fiber layers and a second stack of second end portions of the two or more reinforcement fiber layers wherein the first and second stacks are in overlying relationship with respect to the mandrel; and
    moving the first stack of the first end portions and the second stack of the second end portions of the two or more reinforcement fiber layers out of overlying relationship with respect to the mandrel.

2. The method for fabricating of claim 1, the step of positioning the two or more reinforcement fiber layers about the mandrel further includes the two or more reinforcement fiber layers being braided and the two or more reinforcement fiber layers being concentrically arranged about the mandrel.

3. The method of fabricating of claim 1, further including a step of positioning the mandrel with the two or more reinforcement fiber layers, cutting plate and the at least one additional reinforcement fiber layer into a supporting tool.

4. The method for fabricating of claim 3, wherein the step of cutting through the two or more reinforcement fiber layers includes cutting the two or more reinforcement fiber layers in alignment with the cutting plate.

5. The method for fabricating of claim 4, the step of moving the first stack of the first end portions and the second stack of the second end portions includes:
    a step of positioning a portion of the first stack of the first end portions to extend in a first direction overlying a first portion of the supporting tool; and
    a step of positioning a portion of the second stack of the second end portions to extend in a second direction overlying a second portion of the supporting tool, wherein the first and second directions extend in opposite directions to one another.

6. The method for fabricating of claim 5, further including a step of removing the cutting plate.

7. The method for fabricating of claim 5, the step of moving the first stack of the first end portions and the second stack of the second end portions, further includes:
    a step of positioning a first end section of at least one layer of the first stack of the first end portions in an angular relationship with respect to the first direction; and
    a step of positioning a second end section of at least one layer of the second stack of the second end portions in an angular relationship with respect to the second direction.

8. The method for fabricating of claim 5, further including:
    a step of positioning a first radial filler member adjacent to a last layer of the at least one additional reinforcement fiber layer and adjacent to a last layer of the first stack of first end portions of the two or more reinforcement fiber layers; and
    a step of positioning a second radial filler member adjacent to the last layer of the at least one additional reinforcement fiber layer and adjacent to a last layer of the second stack of the second end portions of the two or more reinforcement fiber layers.

9. The method for fabricating of claim 8, further including:
    a step of positioning at least one composite skin ply in an overlying position related to the first stack of first end portions of the two or more reinforcement fiber layers, the second stack of second end portions of the two or more reinforcement fiber layers, the first and second radial filler members and the last layer of the at least one additional reinforcement fiber layer;
    a step of infusing a resin within a preform assembly including the first stack of first end portions of the two or more reinforcement fiber layers, second stack of second end portions of the two or more reinforcement fiber layers, a remainder of the two or more reinforcement fiber layers positioned between the first stack of the first end portions and the second stack of the second end portions, the first and second radial filler members and the at least one additional reinforcement fiber layer; and
    a step of co-curing the infused preform assembly including first stack of first end portions of the two or more reinforcement fiber layers, second stack of second end portions of the two or more reinforcement fiber layers, the remainder of the two or more reinforcement fiber layers positioned between the first stack of the first end portions and the second stack of the second end portions, the first and second radial filler members and the at least one additional reinforcement fiber layer with the at least one composite skin ply.

10. The method for fabricating of claim 1, further including a step of removing the mandrel from a supporting tool.

11. The method for fabricating of claim 10, further including a step of positioning at least one additional reinforcement fiber layer about a second mandrel.

12. The method for fabricating of claim 11, further including a step of positioning the second mandrel with the at least one additional reinforcement fiber layer into the supporting tool.

13. The method for fabricating of claim 12, further including:
a step of positioning a first radial filler member adjacent to a last layer of the at least one additional reinforcement fiber layer and adjacent to a last layer of the first stack of the first end portions of the two or more reinforcement fiber layers; and
a step of positioning a second radial filler member adjacent to the last layer of the at least one additional reinforcement fiber layer and adjacent to a last layer of the second stack of the second end portions of the two or more reinforcement fiber layers.

14. The method for fabricating of claim 13, further including a step of positioning at least one composite skin ply in an overlying position related to first stack of first end portions of the two or more reinforcement fiber layers, the second stack of second end portions of the two or more reinforcement fiber layers, the first and second radial filler members and the last layer of the at least one additional reinforcement fiber layer.

15. The method for fabricating of claim 14, further including a step of:
infusing a resin within a preform assembly including the at least one additional reinforcement fiber layer, the first and second radial filler members, the first stack of first end portions of the two or more reinforcement fiber layers, the second stack of the second end portions of the two or more reinforcement fiber layers and a remainder of the two or more reinforcement fiber layers positioned between the first stack of the first end portions and the second stack of the second end portions; and
co-curing the infused preform assembly including the at least one additional reinforcement fiber layer, the first and second radial filler members, the first stack of the first end portions of the two or more reinforcement fiber layers and the second stack of the second end portions of the two or more reinforcement fiber layers and the remainder of the two or more reinforcement fiber layers positioned between the first stack of the first end portions and the second stack of the second end portions, with the at least one composite skin ply.

16. The method for fabricating of claim 1, wherein moving the first stack further includes positioning a portion of the first stack of the first end portions of the two or more reinforcement fiber layers to extend in a first direction in overlying relationship with respect to a support tool.

17. The method for fabricating of claim 16, wherein moving further includes positioning of at least one layer of the first stack of the first end portions of the two or more reinforcement fiber layers to extend in a direction in angular relationship with respect to the first direction wherein a layer of the two or more reinforcement fiber layers extends along an on an angular wall of the support tool relative to the first direction.

18. The method for fabricating of claim 17, wherein moving the second stack further includes positioning a portion of the second stack of the second end portions of the two or more reinforcement fiber layers to extend in a second direction in overlying relationship with respect to the support tool wherein the second direction is an opposite direction to the first direction.

19. The method for fabricating of claim 18, wherein moving further includes positioning of at least one layer of the second stack of the second end portions of the two or more reinforcement fiber layers to extend in a direction in angular relationship with respect to the second direction wherein a layer of the two or more reinforcement fiber layers extends along an angular wall of the support tool relative to the second direction.

20. The method for fabricating of claim 19, wherein:
cutting through the two or more reinforcement fiber layers in overlying relationship with respect to the mandrel provides a layer within the first stack, furthest from the mandrel, to have a greater length of the first end portions of the first stack with moving the first stack of the first end portions out of overlying relationship with respect to the mandrel; and
cutting through the two or more reinforcement fiber layers in overlying relationship with respect to the mandrel provides a layer within the second stack, furthest from the mandrel, to have a greater length of the second end portions of the second stack with moving the second stack of the second end portions out of overlying relationship with respect to the mandrel.

* * * * *